US011361557B2

(12) United States Patent
Lee et al.

(10) Patent No.: US 11,361,557 B2
(45) Date of Patent: Jun. 14, 2022

(54) ATTENTION-BASED RECURRENT CONVOLUTIONAL NETWORK FOR VEHICLE TAILLIGHT RECOGNITION

(71) Applicant: TOYOTA RESEARCH INSTITUTE, INC., Los Angeles, CA (US)

(72) Inventors: Kuan-Hui Lee, Santa Clara, CA (US); Takaaki Tagawa, Tokyo (JP); Jia-En M. Pan, Mountain View, CA (US); Adrien Gaidon, Mountain View, CA (US); Bertrand Douillard, Menlo Park, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 570 days.

(21) Appl. No.: 16/389,255

(22) Filed: Apr. 19, 2019

(65) Prior Publication Data
US 2020/0234066 A1    Jul. 23, 2020

Related U.S. Application Data

(60) Provisional application No. 62/794,108, filed on Jan. 18, 2019.

(51) Int. Cl.
*G06V 20/58* (2022.01)
*G06K 9/62* (2022.01)
(Continued)

(52) U.S. Cl.
CPC ......... *G06V 20/584* (2022.01); *G05D 1/0088* (2013.01); *G05D 1/0221* (2013.01);
(Continued)

(58) Field of Classification Search
CPC ............. G06K 9/00825; G06K 9/6228; G06K 9/3233; G05D 1/0088; G05D 1/0221; G05D 2201/0213
See application file for complete search history.

(56) References Cited

U.S. PATENT DOCUMENTS 9,760,806 B1    9/2017  Ning et al.
10,061,322 B1   8/2018  Palefsky-Smith
(Continued)

FOREIGN PATENT DOCUMENTS

| CN | 108776796 A | * | 11/2018 | |
| WO | WO-2016156236 A1 | * | 10/2016 | ........... G01S 13/931 |
| WO | WO-2019060583 A1 | * | 3/2019 | ........... G06K 9/6256 |

OTHER PUBLICATIONS

Yoneda et al.; Convolutional Neural Network Based Vehicle Turn Signal Recognition; ICIIBMS 2017; Track:2 Artificial Intelligence, Robotics and Human-Computer Interaction; Okinawa, Japan (Year: 2017).*

(Continued)

*Primary Examiner* — Michael J Zanelli
(74) *Attorney, Agent, or Firm* — Seyfarth Shaw LLP (57) ABSTRACT

A method for performing vehicle taillight recognition is described. The method includes extracting spatial features from a sequence of images of a real-world traffic scene during operation of an ego vehicle. The method includes selectively focusing a convolutional neural network (CNN) of a CNN-long short-term memory (CNN-LSTM) framework on a selected region of the sequence of images according to a spatial attention model for a vehicle taillight recognition task. The method includes selecting, by an LSTM network of the CNN-LSTM framework, frames within the selected region of the sequence of images according to a temporal attention model for the vehicle taillight recognition task. The method includes inferring, according to the selected frames within the selected region of the sequence of images, an intent of an ado vehicle according to a taillight state. The method includes planning a trajectory of the ego vehicle from the intent inferred from the ado vehicle.

20 Claims, 7 Drawing Sheets

(51) Int. Cl.
      *G05D 1/00*         (2006.01)
      *G05D 1/02*         (2020.01)

(52) U.S. Cl.
      CPC ......... *G05D 1/0251* (2013.01); *G06K 9/6228* (2013.01); *G06K 9/6232* (2013.01); *G05D 2201/0213* (2013.01)

(56) References Cited

U.S. PATENT DOCUMENTS

| | | |
|---|---|---|
| 10,127,465 B2 | 11/2018 | Cohen et al. |
| 10,845,818 B2* | 11/2020 | Kehl ................... G06N 3/006 |
| 2017/0131719 A1* | 5/2017 | Micks ............... B60W 60/0027 |
| 2017/0364758 A1* | 12/2017 | Minster ............. G06K 9/00825 |
| 2019/0087672 A1* | 3/2019 | Wang ................... G06K 9/6288 |
| 2019/0092318 A1* | 3/2019 | Mei ..................... G06K 9/00825 |
| 2019/0315274 A1* | 10/2019 | Mehdi ............... B60W 30/0956 |
| 2019/0370574 A1* | 12/2019 | Wang ....................... G06N 3/08 |
| 2019/0384994 A1* | 12/2019 | Frossard ............. G06K 9/3233 |
| 2020/0234066 A1* | 7/2020 | Lee ..................... G05D 1/0088 |
| 2020/0334476 A1* | 10/2020 | Wang ................. G06K 9/00825 |

OTHER PUBLICATIONS

Hsu et al.; Learning to Tell Brake and Turn Signals in Videos Using CNN-LSTM Structure; 2017 IEEE 20th Intl. Conf. on Intelligent Transportation Systems (ITSC); Oct. 16-19, 2017 (Year: 2017).*

Chi, et al., "Deep Steering: Learning End-toEnd Driving Model from Spatial and Temporal Visual Cues," arXiv.org, Aug. 12, 2017, pp. 1-12.

Xu, et al., "End-to-end Learning of Driving Models from Large-scale Video Datasets," arXiv.org, Dec. 4, 2016, pp. 1-9.

* cited by examiner

ATTENTION-BASED RECURRENT CONVOLUTIONAL NETWORK FOR VEHICLE TAILLIGHT RECOGNITION

CROSS REFERENCE TO RELATED APPLICATION

The present application claims priority to U.S. Provisional Patent Application No. 62/794,108, filed on Jan. 18, 2019, and titled "AN ATTENTION-BASED RECURRENT CONVOLUTIONAL NETWORK FOR VEHICLE TAILLIGHT RECOGNITION," the disclosure of which is expressly incorporated by reference herein in its entirety.

BACKGROUND

Field

Certain aspects of the present disclosure generally relate to machine learning and, more particularly, to a system and method for an attention-based recurrent convolutional network for vehicle taillight recognition.

Background

Autonomous agents (e.g., vehicles, robots, etc.) rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and using the 3D structure for fully understanding a scene. That is, machine vision strives to provide a high-level understanding of a surrounding environment, as performed by the human visual system.

In operation, autonomous agents may rely on a trained convolutional neural network (CNN) to identify objects within areas of interest in an image of a surrounding scene of the autonomous agent. For example, a CNN may be trained to identify and track objects captured by sensors, such as light detection and ranging (LIDAR) sensors, sonar sensors, red-green-blue (RGB) cameras, RGB-depth (RGB-D) cameras, and the like. The sensors may be coupled to, or in communication with, a device, such as an autonomous agent. Object detection applications for autonomous agents may analyze sensor image data for detecting objects in the surrounding scene from the autonomous agent.

Autonomous agents, such as driverless cars and robots, are quickly evolving and have become a reality in this decade. Unfortunately, because autonomous vehicles have to interact with other non-autonomous vehicles, many concerns arise. In particular, vehicle taillight recognition is an important application in autonomous driving. For example, vehicle taillight recognition is important for intention prediction of autonomous dynamic object (ADO) vehicle for setting an ego vehicle's trajectory planning. Unfortunately, learning to accurately recognize taillights (e.g., rear turn and brake signals) from, for example, a video sequence remains elusive.

SUMMARY

A method for performing vehicle taillight recognition is described. The method includes extracting spatial features from a sequence of images of a real-world traffic scene during operation of an ego vehicle. The method includes selectively focusing a convolutional neural network (CNN) of a CNN-long short-term memory (CNN-LSTM) framework on a selected region of the sequence of images according to a spatial attention model for a vehicle taillight recognition task. The method includes selecting, by an LSTM network of the CNN-LSTM framework, frames within the selected region of the sequence of images according to a temporal attention model for the vehicle taillight recognition task. The method includes inferring, according to the selected frames within the selected region of the sequence of images, an intent of an ado vehicle according to a taillight state. The method includes planning a trajectory of the ego vehicle from the intent inferred from the ado vehicle.

A non-transitory computer-readable medium having program code recorded thereon is described. The medium includes program code to extract spatial features from a sequence of images of a real-world traffic scene during operation of an ego vehicle. The medium includes program code to selectively focus a convolutional neural network (CNN) of a CNN-long short-term memory (CNN-LSTM) framework on a selected region of the sequence of images according to a spatial attention model. The medium includes program code to select, by an LSTM network of the CNN-LSTM framework, frames within the selected region of the sequence of images according to a temporal attention model. The medium includes program code to infer an intent of an ado vehicle according to a taillight state determined from the frames of the image regions. The medium includes program code to plan a trajectory of the ego vehicle according to the intent inferred from the ado vehicle.

A vehicle taillight recognition system is described. The system includes a taillight recognition module configured to extract spatial features from a sequence of images of a real-world traffic scene during operation of an ego vehicle. This module includes a convolutional neural network (CNN) of a CNN-long short-term memory (CNN-LSTM) framework configured to selectively focus on a selected region of the sequence of images according to a spatial attention model. The module includes an LSTM network of the CNN-LSTM framework configured to select frames within the selected region of the sequence of images according to a temporal attention model. The system includes an intent inference module configured to infer an intent of an ado vehicle according to a taillight state of the ado vehicle. The system includes a trajectory planner module configured to plan a trajectory of the ego vehicle according to the intent inferred from the ado vehicle.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

Aspects of the present disclosure are directed to an end-to-end, recurrent convolutional network for vehicle taillight recognition. One aspect of the present disclosure is directed to a convolutional neural network (CNN)-long short-term memory (CNN-LSTM) framework for vehicle taillight recognition. In this aspect of the present disclosure, a spatial attention model is integrated with a CNN of the CNN-LSTM framework for training the CNN-LSTM framework to selectively focus on certain regions of the images in a sequence of images. In addition, a temporal attention model is integrated with an LSTM network of the CNN-LSTM framework for helping train the LSTM network to perform frame selection within the selected region of the sequence of images. For example, the spatial attention model may be configured along a temporal dimension (e.g., direction) to focus on portions of the sequence of images important to vehicle taillight recognition.

Operation of autonomous vehicles and semi-autonomous vehicles may be controlled or adjusted based on predicted actions (e.g., behaviors) of surrounding agents, such as vehicles and pedestrians. For example, a route may be planned for an autonomous vehicle (e.g., an ego vehicle) based on the predicted actions of surrounding agents (e.g., an ado vehicle). In addition, a route may be adjusted to avoid a collision based on the predicted actions of surrounding agents. In the present disclosure, unless otherwise noted, a vehicle refers to an autonomous agent or a semi-autonomous agent.

Conventional vehicles are controlled based on predicted trajectories of surrounding agents. The trajectories of surrounding agents may be predicted using Markov chains, or other probabilistic approaches, to provide a low-level prediction of movements. The trajectories predict where an agent may travel from a current time to a future time. These predicted trajectories may adjust a route of the autonomous agent (e.g., an ego vehicle) to avoid a collision based on the predicted actions of surrounding agents (e.g., an ado vehicle).

Development of perception technologies enable autonomous vehicles to drive well on the road without human involvement. Nevertheless, higher level concepts such as intention prediction, human-machine interaction, and vehicle-to-vehicle communication remain open questions. In particular, intention prediction of ado vehicles is an important feature for autonomous driving safety. Achieving attention prediction of the ado vehicle by an ego vehicle involves understanding gestures from the ado vehicle (e.g., turn and brake signals).

According to aspects of the present disclosure, a CNN-LSTM framework is equipped with attention models for spatial and temporal dimensions. Such spatial attention models and temporal attention models emphasize on focal regions of the images as well as more important time steps of the image sequence. As a result, the proposed CNN-LSTM framework outperforms the baseline results by achieving better inference prediction of ado vehicle's intention(s) with significantly improved performance accuracy.

Figure 1:
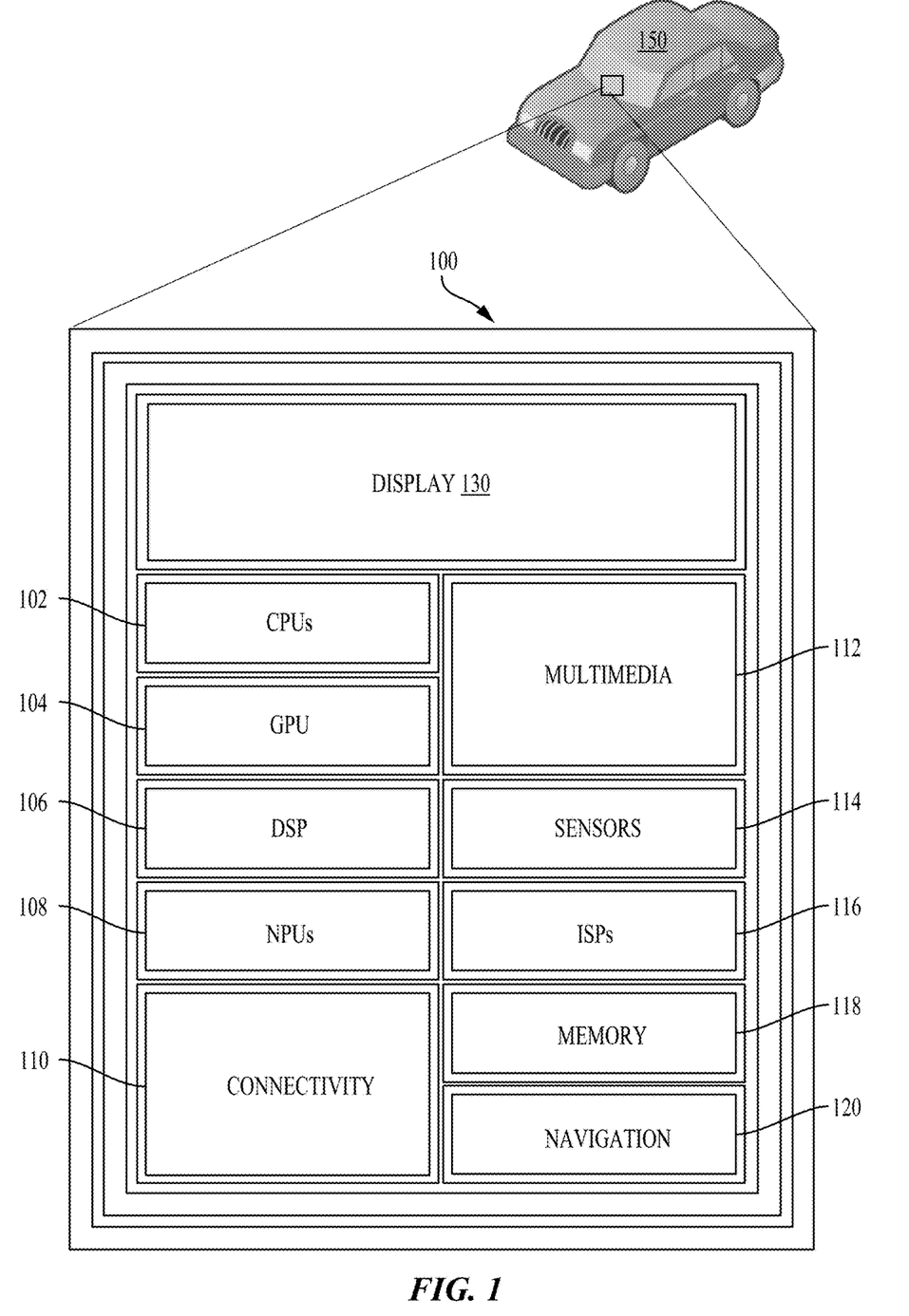
FIG. 1 illustrates an example implementation of designing a neural network using a system-on-a-chip (SOC) for a vehicle taillight recognition system of an autonomous vehicle, in accordance with aspects of the present disclosure.

FIG. 1 illustrates an example implementation of the aforementioned system and method for a convolutional neural network (CNN)-long short-term memory (CNN-LSTM) framework for vehicle taillight recognition using a system-on-a-chip (SOC) 100 of a vehicle vision system for an autonomous vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth connectivity, and the like. In addition, a multimedia processor 112 in combination with a display 130 may, for example, classify and categorize poses of objects in an area of interest, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the autonomous vehicle 150. In this arrangement, the autonomous vehicle 150 may include a processor and other features of the SOC 100. In this aspect of the present disclosure, instructions loaded into a processor (e.g., CPU 102) or the NPU 108 of the autonomous vehicle 150 may include code for detecting/recognizing vehicle taillights of an ado vehicle in a region of interest in an image captured by the sensor processor 114. The instructions loaded into a processor (e.g., CPU 102) may also include code for planning and control (e.g., intention prediction of the ado vehicle) in response to the vehicle taillights of the ado vehicle detected/recognized in the region of interest in the image captured by the sensor processor 114.

Figure 2:
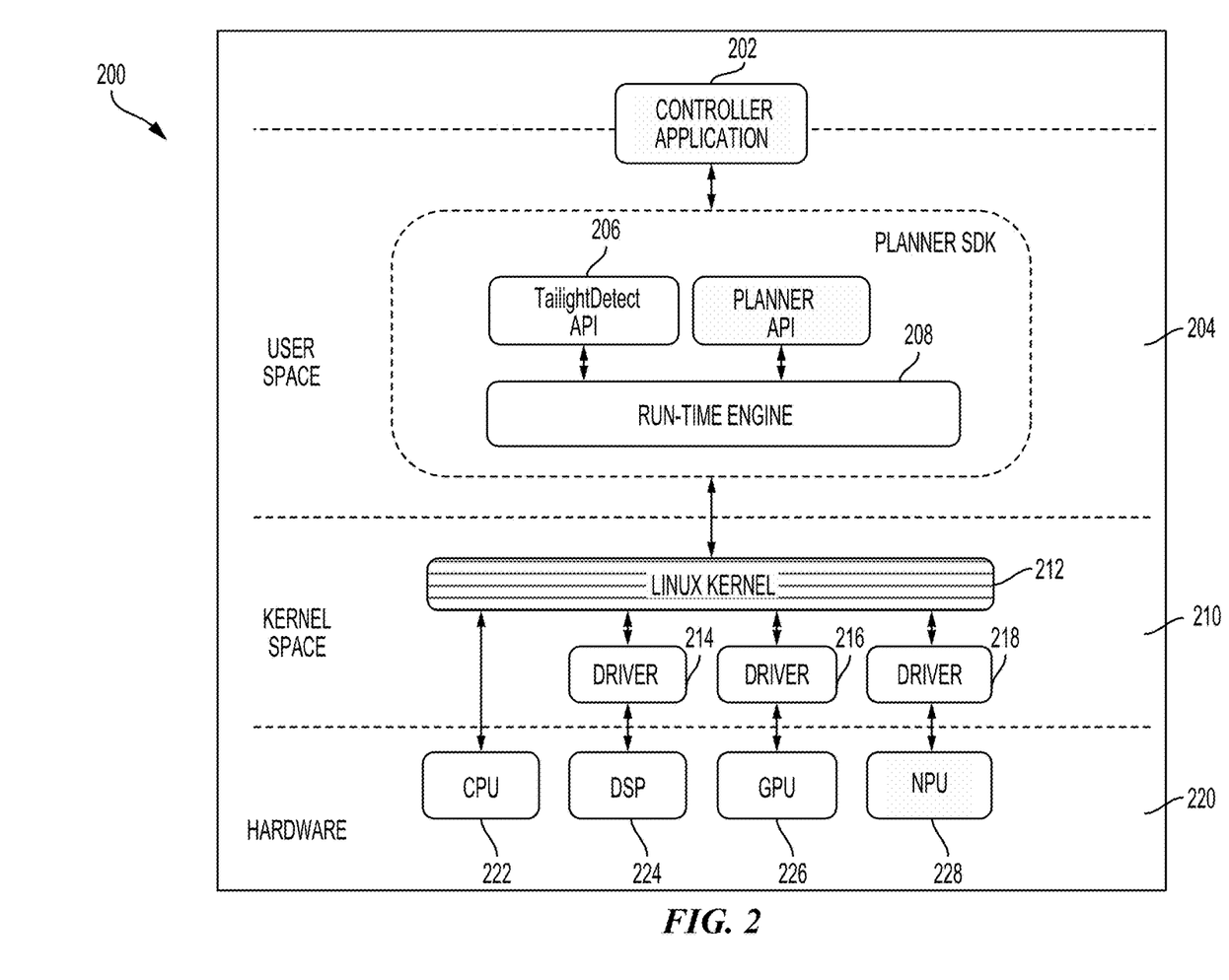
FIG. 2 is a block diagram illustrating a software architecture that may modularize artificial intelligence (AI) functions for vehicle taillight recognition of an autonomous agent vision system, according to aspects of the present disclosure.

FIG. 2 is a block diagram illustrating a software architecture 200 that may modularize artificial intelligence (AI) functions for planning and control of an autonomous agent for inferring ado vehicle intention in response to ado vehicle taillight recognition, according to aspects of the present disclosure. Using the architecture, a controller application 202 may be designed such that it may cause various processing blocks of an SOC 220 (for example a CPU 222, a DSP 224, a GPU 226 and/or an NPU 228) to perform supporting computations during run-time operation of the controller application 202.

The controller application 202 may be configured to call functions defined in a user space 204 that may, for example, provide for taillight recognition of ado vehicles. The controller application 202 may make a request to compile program code associated with a library defined in a TaillightDetect application programming interface (API) 206 to perform taillight recognition of an ado vehicle. This request may ultimately rely on the output of a convolutional neural network configured to focus on portions of the sequence of images critical to vehicle taillight recognition.

A run-time engine 208, which may be compiled code of a runtime framework, may be further accessible to the controller application 202. The controller application 202 may cause the run-time engine 208, for example, to take actions for controlling the autonomous agent. When an ado vehicle is detected within a predetermined distance of the autonomous agent, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
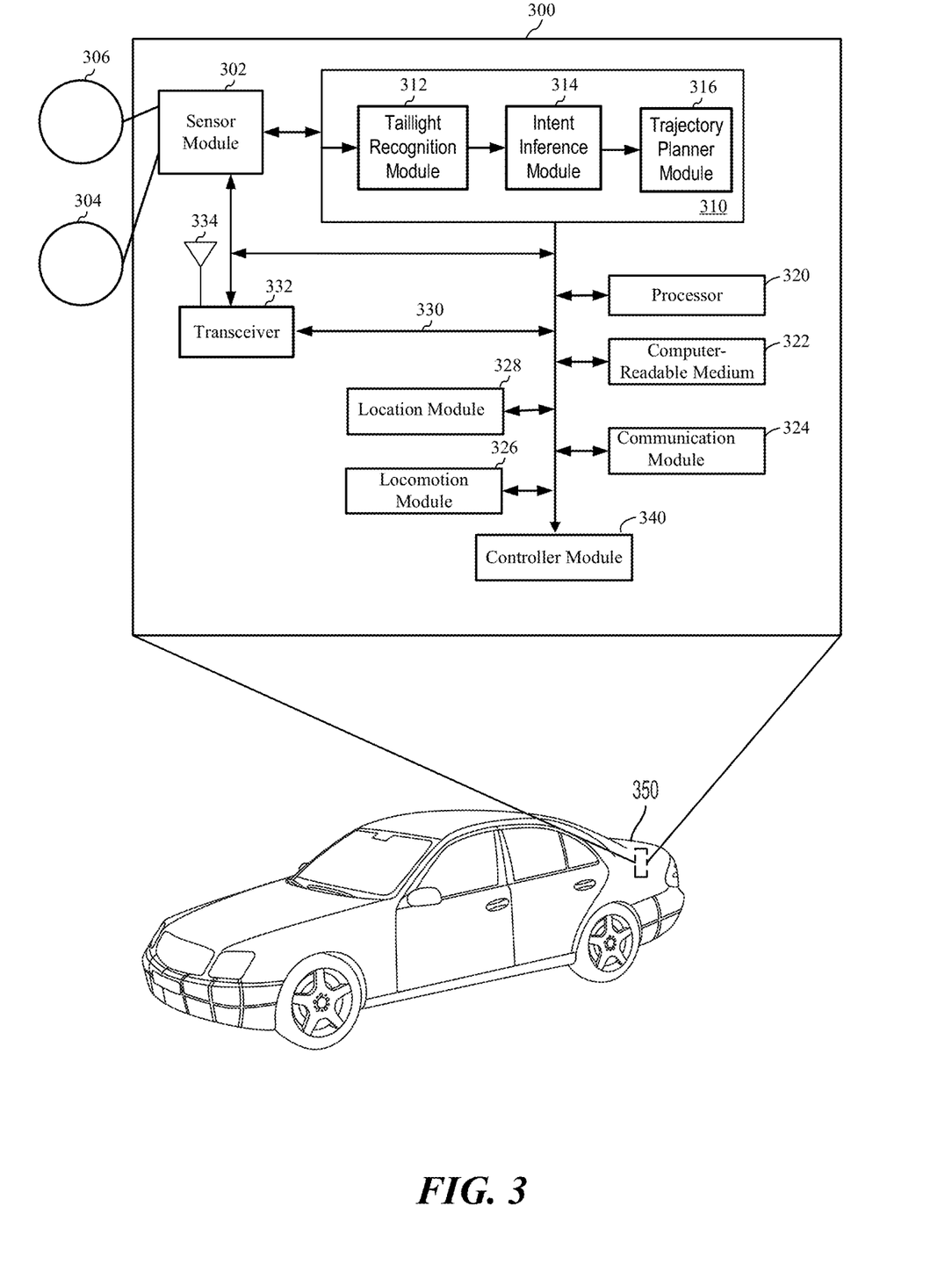
FIG. 3 is a diagram illustrating an example of a hardware implementation for a vehicle taillight recognition system, according to aspects of the present disclosure.

FIG. 3 is a diagram illustrating an example of a hardware implementation for a vehicle taillight recognition system 300, according to aspects of the present disclosure. The vehicle taillight recognition system 300 may be configured for trajectory planning and control of an ego vehicle by inferring an intention of an ado vehicle in response to taillight recognition of the ado vehicle. The vehicle taillight recognition system 300 may be a component of a vehicle, a robotic device, or other device. For example, as shown in FIG. 3, the vehicle taillight recognition system 300 is a component of a car 350 (e.g., an ego vehicle). Aspects of the present disclosure are not limited to the vehicle taillight recognition system 300 being a component of the car 350. Other devices, such as a bus, motorcycle, or other like vehicle, are also contemplated for using the vehicle taillight recognition system 300. The car 350 may be autonomous or semi-autonomous.

The vehicle taillight recognition system 300 may be implemented with an interconnected architecture, represented generally by an interconnect 330. The interconnect 330 may include any number of point-to-point interconnects, buses, and/or bridges depending on the specific application of the vehicle taillight recognition system 300 and the overall design constraints. The interconnect 330 links together various circuits including one or more processors and/or hardware modules, represented by a sensor module 302, an intent-planner module 310, a processor 320, a computer-readable medium 322, communication module 324, a locomotion module 326, a location module 328, and a controller module 340. The interconnect 330 may also link various other circuits such as timing sources, peripherals, voltage regulators, and power management circuits, which are well known in the art, and therefore, will not be described any further.

The vehicle taillight recognition system 300 includes a transceiver 332 coupled to the sensor module 302, the intent-planner module 310, the processor 320, the computer-readable medium 322, the communication module 324, the locomotion module 326, the location module 328, and the controller module 340. The transceiver 332 is coupled to an antennae 334. The transceiver 332 communicates with various other devices over a transmission medium. For example, the transceiver 332 may receive commands via transmissions from a user or a remote device. Alternatively, the user is a driver of the car 350. As another example, the transceiver 332 may transmit planned trajectories from the intent-planner module 310 to a server (not shown).

The vehicle taillight recognition system 300 includes the processor 320 coupled to the computer-readable medium 322. The processor 320 performs processing, including the execution of software stored on the computer-readable medium 322 to provide functionality according to the disclosure. The software, when executed by the processor 320, causes the vehicle taillight recognition system 300 to perform the various functions described for an ego vehicle, such as the car 350, or any of the modules (e.g., 302, 310, 324, 326, 328, and/or 330). The computer-readable medium 322 may also be used for storing data that is manipulated by the processor 320 when executing the software.

The sensor module 302 may obtain measurements via different sensors, such as a first sensor 306 and a second sensor 304. The first sensor 306 may be a vision sensor (e.g., a stereoscopic camera or a red-green-blue (RGB) camera) for capturing 2D images. The second sensor 304 may be a ranging sensor, such as a light detection and ranging (LIDAR) sensor or a radio detection and ranging (RADAR) sensor. Of course, aspects of the present disclosure are not limited to the aforementioned sensors as other types of sensors (e.g., thermal, sonar, and/or lasers) are also contemplated for either of the second sensor 304 or the first sensor 306.

The measurements of the first sensor 306 and the second sensor 304 may be processed by the processor 320, the sensor module 302, the intent-planner module 310, the communication module 324, the locomotion module 326, the location module 328, and/or the controller module 340. In conjunction with the computer-readable medium 322, the measurements of the first sensor 306 and the second sensor 304 are processed to implement the functionality described herein. In one configuration, the data captured by the first sensor 306 and the second sensor 304 may be transmitted to an external device via the transceiver 332. The first sensor 306 and the second sensor 304 may be coupled to the car 350 or may be in communication with the car 350.

The location module 328 may determine a location of the car 350. For example, the location module 328 may use a global positioning system (GPS) to determine the location of the car 350. The communication module 324 may facilitate communications via the transceiver 332. For example, the communication module 324 may be configured to provide communication capabilities via different wireless protocols, such as WiFi, long term evolution (LTE), 3G, etc. The communication module 324 may also communicate with other components of the car 350 that are not modules of the vehicle taillight recognition system 300.

The vehicle taillight recognition system 300 also includes the controller module 340 for planning a route and controlling the locomotion of the car 350, via the locomotion module 326, based on the intent-planner module 310. In one configuration, the controller module 340 may override a user input when the user input is expected (e.g., predicted) to cause a collision. The modules may be software modules running in the processor 320, resident/stored in the computer-readable medium 322, and/or hardware modules coupled to the processor 320, or some combination thereof.

The intent-planner module 310 may be in communication with the sensor module 302, the processor 320, the computer-readable medium 322, the communication module 324, the location module 328, the locomotion module 326, the controller module 340, and the transceiver 332. In one configuration, the intent-planner module 310 receives sensor data from the sensor module 302. The sensor module 302 may receive the sensor data from the first sensor 306 and the second sensor 304. According to aspects of the disclosure, the sensor module 302 may filter the data to remove noise, encode the data, decode the data, merge the data, extract frames, or perform other functions. In an alternate configuration, the intent-planner module 310 may receive sensor data directly from the first sensor 306 and the second sensor 304.

As shown in FIG. 3, the intent-planner module 310 includes a taillight recognition module 312, an intent inference module 314, and a trajectory planner module 316. The taillight recognition module 312, the intent inference module 314, and the trajectory planner module 316 may be components of a same or different artificial neural network, such as a deep convolutional neural network (CNN). The intent-planner module 310 is not limited to a CNN. The taillight recognition module 312 receives a data stream from the first sensor 306 and/or the second sensor 304. The data stream may include a 2D RGB image from the first sensor 306 and LIDAR data points from the second sensor 304. The data stream may include multiple frames, such as image frames.

The taillight recognition module 312 may include a spatial attention model and temporal model. Each model may be a distinct artificial neural network. Each model in the taillight recognition module 312 may supplement a convolutional neural network (CNN)-long short-term memory (CNN-LSTM) framework for vehicle taillight recognition. In this aspect of the present disclosure, the spatial attention model of the taillight recognition module 312 is integrated with a CNN of the CNN-LSTM framework. The spatial attention model may help to train the CNN-LSTM framework to selectively focus on certain regions of images in a sequence of images. In addition, a temporal attention model of the taillight recognition module 312 is integrated with an LSTM network of the CNN-LSTM framework. The temporal attention model may help train the LSTM network to perform frame selection within the sequence of images. For example, the spatial attention model may be configured along a temporal dimension (e.g., direction) to focus on portions of a sequence of images important to vehicle taillight recognition, for example, as shown in FIG. 4.

Figure 4:
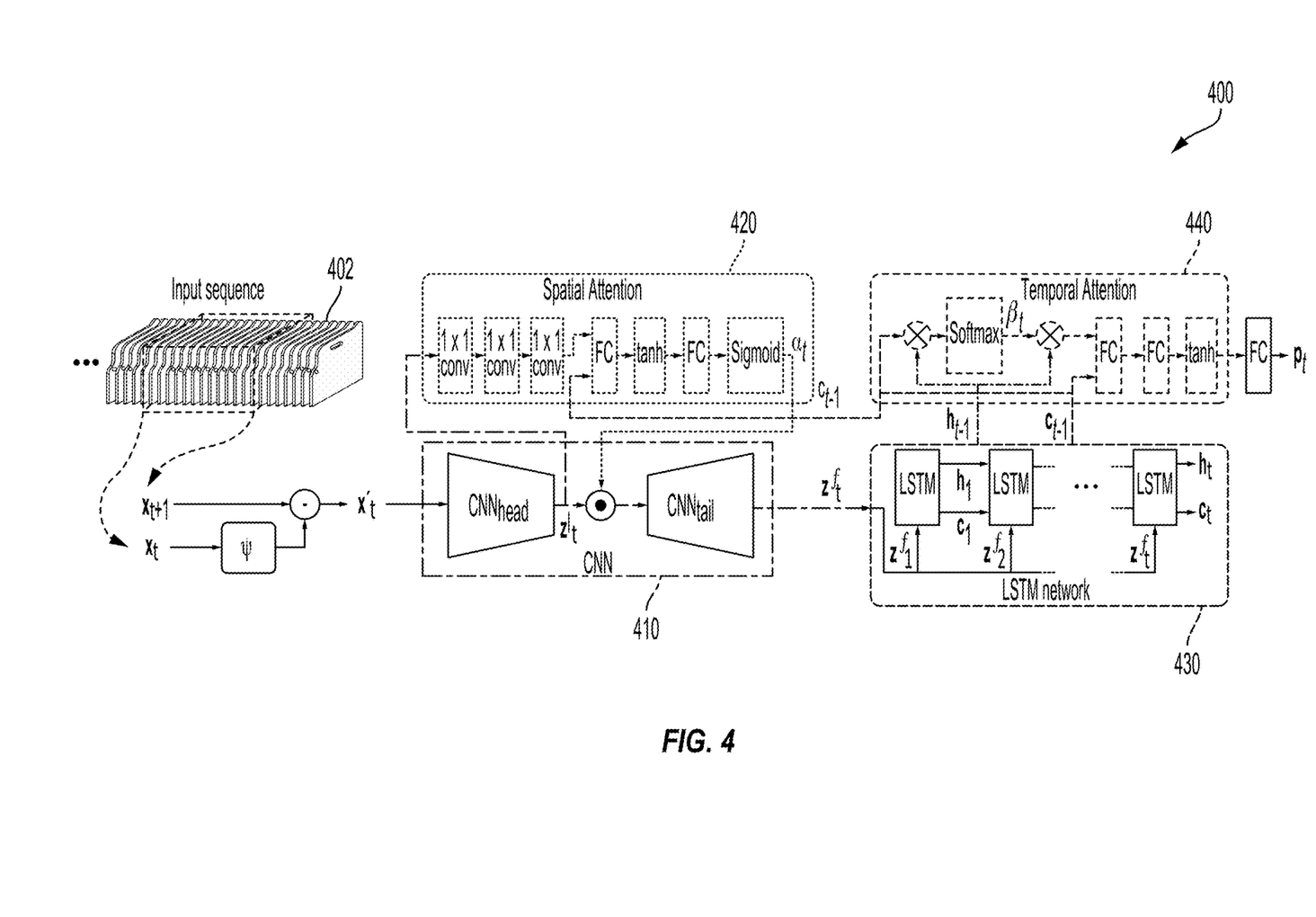
FIG. 4 is a block diagram illustrating a convolutional neural network (CNN)-long short-term memory (CNN-LSTM) framework for vehicle taillight recognition, according to aspects of the present disclosure.

FIG. 4 is a block diagram illustrating a convolutional neural network (CNN)-long short-term memory (CNN-LSTM) framework 400 for vehicle taillight recognition, according to aspects of the present disclosure. The CNN-LSTM framework 400 integrates a spatial attention model 420 and a temporal attention model 440 for vehicle taillight recognition. An overview of the CNN-LSTM framework 400 is shown in FIG. 4.

Representatively, an input image sequence 402 of the CNN-LSTM framework 400 is a chunk of a video sequence, typically sampled by window-sliding along the temporal direction. In this configuration, an instance detection/segmentation technique is used to extract an ego vehicle's bounding boxes from video frames of the input images sequence. For example, assume $X = \{x_t\}_{t=1}^{T+1}$ is a chunk of a video with T+1 frames, where $x_t$ is the $t^{th}$ frame in the chunk. First, a frame difference $x'_t$ is calculated to align the vehicles in successive frames:

$$X'_t = |\Psi^{t \to t+1}(X_t) - X_{t+1}|, \text{ for } t=1,2,\ldots,T. \tag{1}$$

where $\Psi^{t \to t+1}(\square)$ is a warping function, from the $t^{th}$ frame to the next frame.

Each image is forwarded to certain layers of a CNN 410 (e.g., $CNN_{head}$) to obtain deep features in the $l^{th}$ layers, denoted by $Z^l = \{z_t^l\}_{t=1}^T$. The input of the spatial attention model 420, $z_t^l$, is forwarded to two 2-D convolutional layers, and the output is concatenated with last hidden variable $h_{t-1}$ from an LSTM network 430. Then, the concatenated tensors are forwarded to the fully connected layers (FC), the hyperbolic tangent (tanh) layer, and the softmax layer, to obtain the attention weights $\alpha_t$. The attention weights element-wise product with $z_t^l$ is computed to obtain selective deep features, which are then forwarded to the remaining portions of layers of the CNN 410 (e.g., $CNN_{tail}$) for latent features $Z^f = \{z_t^f\}_{i=1}^T$. The latent features are then forwarded to the LSTM network 430 for encoding temporal dependencies.

The input and the output of the LSTM network 430 are recurrent over time steps. At time step t, the input is the latent feature $z_t^f$ from the last fully connected layer of the CNN 410, the hidden variable $h_{t-1}$, and the internal states $c_{t-1}$, while the output is the hidden unit $h_t$ and a memory cell $c_t$ for the next time step. Both $h_t$ and $c_t$ are updated and then passed to the LSTM network 430 at each time step.

The LSTM network 430 outputs a set of hidden variables $H = \{h_t\}_{i=1}^T$ and a set of memory cells $C = \{c_t\}_{i=1}^T$, which are used in the temporal attention model 440. The temporal attention model 440 calculates the attention by dot-production between decoder context and encoder representations. Instead of multiple decoder layers, however, a single layer is used for the output of the LSTM network 430. The inputs $h_t$ and $c_t$, are fused to be a set of state summaries $D = \{d_t\}_{i=1}^T$. Then, H and D perform a matrix production, where the results are followed by a softmax layer for attention selection. The attention weights are then applied to H. The adjusted hidden variables H' are followed by fully connected layers and the tanh layer to obtain class probability distribution $P = \{P_t\}_{i=1}^T$.

Spatial Attention with Region Selection

Visual attention has been shown to be an effective mechanism in image applications, by selectively focusing on certain regions in images. In this aspect of the present disclosure, the spatial attention model 420 is relied on for region selection. First, the inputs $Z^l$, D convolutional layers $\phi_1$ and $\phi_2$ with kernel size 1 are provided. The convolutional layer $\phi_1$ has both input and output channel d, while the convolutional layer $\phi_2$ has input channel d and output channel 1. Then, the 2-D attention weights $\alpha_t(i, j)$ for each time step t at coordinate (i, j) are defined by:

$$a_t = W_a \tanh(W_a^z \phi_2(\phi_1(z_t^l)) + W_a^h h_t + b_a^{zh}) + b_a, \qquad (2)$$

$$\alpha_t(i, j) = \frac{\exp(a_t(i, j))}{\sum_i \sum_j \exp(a_t(i, j))}, \alpha_t \in \mathbb{R}^2 \qquad (3)$$

Where $w_a$, $w_a^z$, $w_a^h$, are the learnable parameter matrices, and $b_a^{zh}$, $b_a$ are the bias vectors. The attention weight $a_t$ is a 2-D matrix where each cell spatially corresponds to the vector in $z_t^l$. A softmax selection is adopted to emphasize the corresponding regions in the latent features. By performing element-wise production with $a_t$, the weighted $z_t^l$ are forwarded to the $CNN_{tail}$ of the CNN 410.

Temporal Attention with Frame Selection

In a sequence, the input at each time t contains temporal information with different importance for the final classification. For example, the moment when taillights are flashing is more valuable than others while the network tries to recognize the state of the vehicle's taillights. Hence, an attention model is equipped along a temporal direction to emphasize critical moments for vehicle taillight recognition.

Based on the outputs provided by the LSTM network 430, the temporal attention model 440, and the spatial attention model 420 are integrated into the CNN-LSTM framework 400. For example, a temporal attention $\beta_{t,u}$ corresponding to the $t^{th}$ state summary and the $u^{th}$ hidden variable is computed as a dot-product between $d_t$ and $h_u$, and then followed by a soft-selection:

$$\beta_{t,u} = \frac{\exp(d_t \cdot h_u)}{\sum_{k=1}^T \exp(d_t \cdot h_k)}. \qquad (4)$$

The state summary $d_t$ at time step t is defined by:

$$d_t = W_d^h h_t + W_d^c \tanh(c_t) + b_d^{hc}, \qquad (5)$$

Where $W_d^h$, $W_d^c$ are the learnable parameter matrices, and $b_d$ is a bias vector. This implies how the $u^{th}$ input contributes to the $t^{th}$ output. Therefore, the output hidden variable is adjusted according to $\beta_{t,u}$:

$$h_t' = \sum_{u=1}^T \beta_{t,u} h_u. \qquad (6)$$

The adjusted hidden variable $h'_t$ is then forwarded to the fully connected layers and tanh layer to obtain final prediction $p_t$ for the $t^{th}$ time step:

$$p_t = W_p \tanh(W_p^h h'_t + W_p^c c_t + b_p^{hc}) + b_p, \qquad (7)$$

Where $W_p$, $W_p^h$, $W_p^c$ are the learnable parameter matrices, and $b_p^{hc}$, $b_a$ are the bias vectors.

Training Procedure

During training, the objective loss is cross entropy loss between the predictions and labels. To take the temporal dependence of an input sequence into account, we focus on the prediction of the last frame (e.g., $p_T$) containing sufficient information from all the previous frames. In other words, the loss of the last frame is computed and back propagated to all frames in the sequence with the same loss.

Due to the mutual influence of the three models, the CNN-LSTM framework 400 is optimized effectively. First, the CNN 410 along with LSTM network 430 are trained from scratch. This allows the main stream of the CNN-LSTM framework 400 to achieve certain convergence. Then, the CNN-LSTM framework 400, along with the temporal attention model 440, are fine-tuned based on the pre-training of the spatial attention model 420 in the first step. Finally, the spatial attention model 420, the temporal attention model 440 and the CNN-LSTM framework 400 are fine-tuned from the pre-training of the temporal attention model 440 in the second step. Such progressive training can enable effective network converge and better perform results.

For example, after learning, the CNN-LSTM framework 400 is equipped with attention models (e.g., 420 and 440) for spatial and temporal dimensions. The spatial attention model 420 and the temporal attention model 440 enable the CNN- LSTM framework 400 to emphasize focal regions of the images of the input image sequence 402, as well as more important time steps of the input image sequence 402. In one aspect of the present disclosure, integration of the spatial attention model 420 with the CNN 410 of the CNN-LSTM framework 400 enables training of the CNN-LSTM framework 400 to selectively focus on certain images in the input image sequence 402 for region selection. In addition, integration of the temporal attention model 440 with the LSTM network 430 of the CNN-LSTM framework 400 helps train the LSTM network 430 to perform frame selection within the sequence of images from the region selection. For example, the spatial attention model 420 may be configured along a temporal dimension (e.g., direction) to focus on portions of the sequence of images from the region selected as important to vehicle taillight recognition.

FIGS. 5A to 5H are images illustrating vehicle taillight states, according to aspects of the present disclosure. In this example, eight different taillight states are based on all combinations of brake and turn lights. As shown FIGS. 5A to 5H, each state is denoted by three letters of "B" (brake), "L" (left), and "R" (right), in which either the corresponding letter is displayed when on, or a letter "O" (off) is displayed the corresponding signal is off. For example, in FIG. 5A all taillights are off (OOO). In FIG. 5B only the brake light is on (BOO); in FIG. 5C only the left turn light is on (OLO); in FIG. 5D both the brake light and the left turn light are on (BLO); in FIG. 5E only the right turn light is on (OOR); in FIG. 5F both the brake light and the right turn light are on (BOR); in FIG. 5G both the left turn light and the right turn light are on (OLR); and in FIG. 5H all the taillights are on (BLR).

Figure 6A:
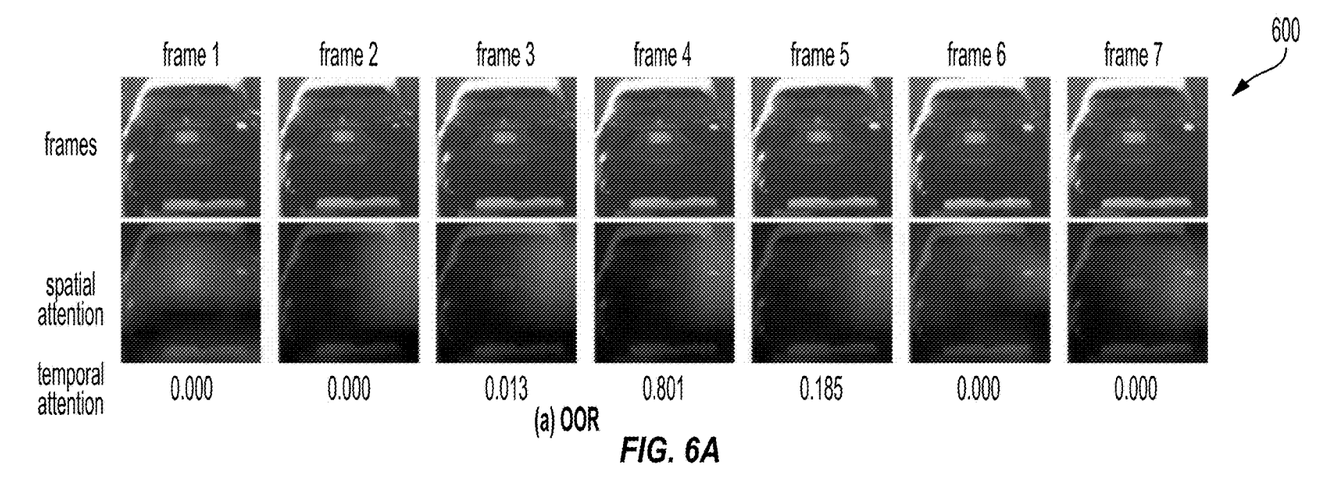
FIGS. 6A and 6B are images illustrating focusing of a convolutional neural network (CNN)-long short-term memory (CNN-LSTM) framework according to a spatial attention model and a temporal attention model, according to aspects of the present disclosure.
Figure 6B:
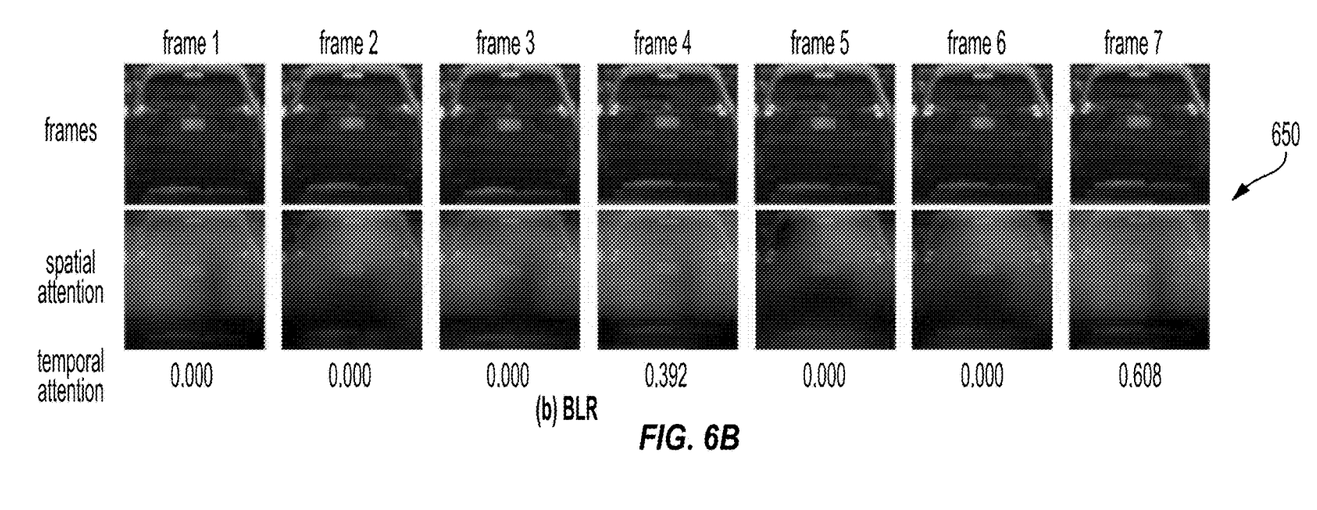

FIGS. 6A and 6B are images illustrating focusing of an CNN-LSTM framework according to a spatial attention model and a temporal attention model, according to aspects of the present disclosure. Representatively, FIGS. 6A and 6B illustrate the spatio-temporal models operating in the CNN-LSTM framework 400 (FIG. 4). For spatial attention model 420, we select l=5 (e.g., the outputs of the conv5_x layer) as deep features. This means that the attention weight $\alpha_t$ is a 7×7 matrix. To properly visualize the attention weights, we resize the attention weight $\alpha_t$ and blend with input frames of the input image sequence 402.

FIG. 6A shows another example of an "OOR" taillight state, in which the right-turn signal is flashing. From frame 1, the spatial attentions are uniformly on the rear of the vehicle. With the right-turn signal gradually off from frame 2 to frame 3, the spatial attention starts to emphasize on the region of the right-turn signal until the last frame. Then, the temporal attention pays much attention to frame 4, while the right-turn signal is on at this time step. Meanwhile, the temporal attention weight goes up to 0.8, which implies that the network pays more attention to significant changes of the signal.

FIG. 6B shows another example of "BLR" taillight state, in which the brake signal is on and both turn signals are flashing. As shown in the FIG. 6B, the spatial attention focuses on both sides of the vehicle. Both left-turn and right-turn signals start to turn on at frame 4. This triggers the network to pay temporal attention to frame 4. The signals stay off until frame 7, while the temporal attention weight goes up to 0.6, which is higher than that in frame 4. This occurs because the CNN-LSTM framework 400 tends to learn a cycle of signal flashing for this chunk of sequences from the input image sequence 402.

Figure 7:
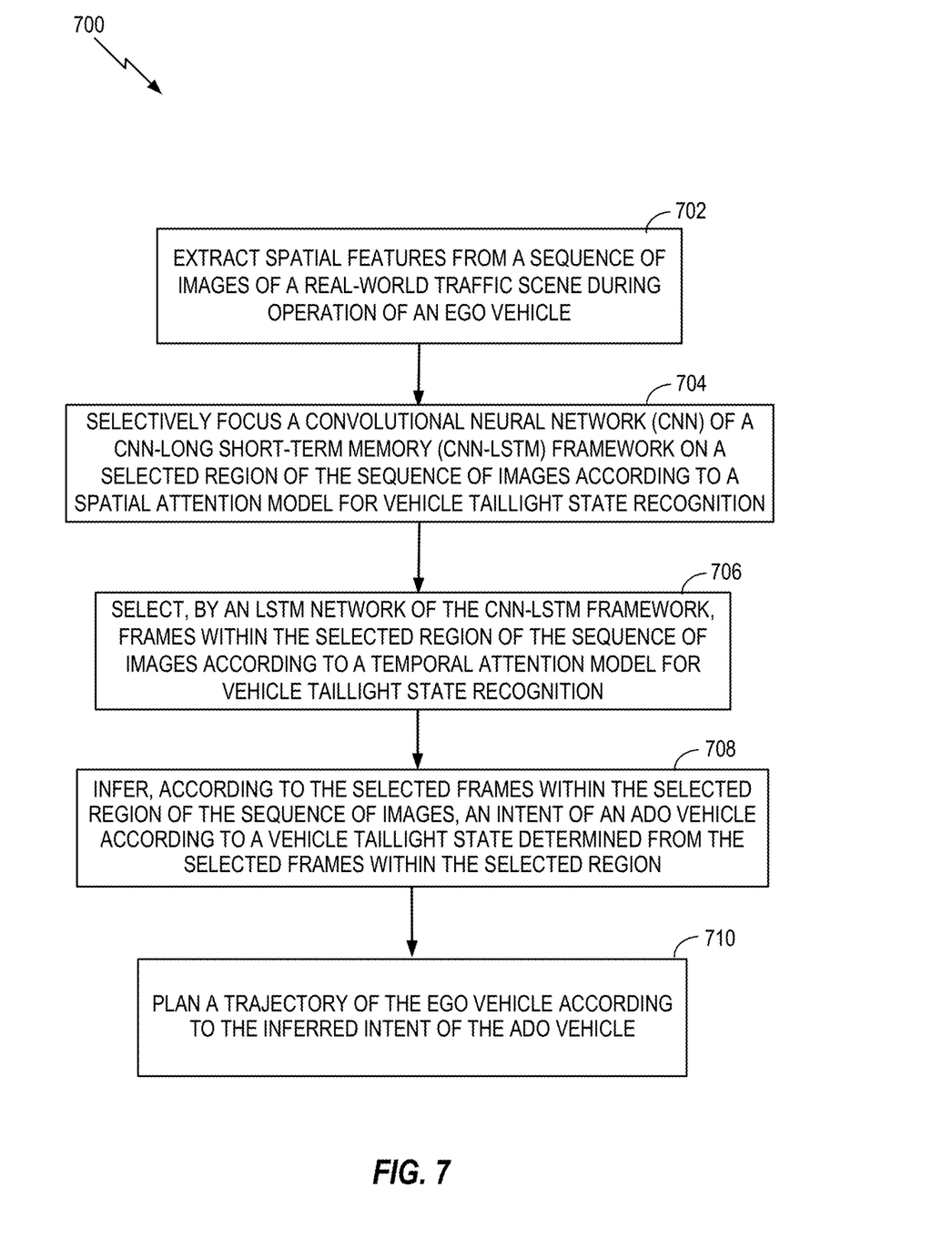
FIG. 7 is a flowchart illustrating a method for vehicle taillight recognition, according to aspects of the present disclosure.

FIG. 7 is a flowchart illustrating a method for vehicle taillight recognition, according to aspects of the present disclosure. A method 700 of FIG. 7 begins at block 702, in which spatial features are extracted from a sequence of images of a real-world traffic scene during operation of an ego vehicle. For example, as shown in FIG. 4, the input image sequence 402 is a sequence of an ego vehicle's bounding boxes extracted from video frames captured by the ego vehicle. At block 704, a convolutional neural network (CNN) of a CNN-long short-term memory (CNN-LSTM) framework is selectively focused on a selected region of the sequence of images according to a spatial attention model for vehicle taillight state recognition. For example, as shown in FIG. 4, the spatial attention model 420 selectively focuses on a selected region (e.g., bounding boxes) in the input image sequence using an attention weight given for each region and forwards the element-wise attention weights to the CNN 410, which is forwarded it to the LSTM network 430.

Figure 5:
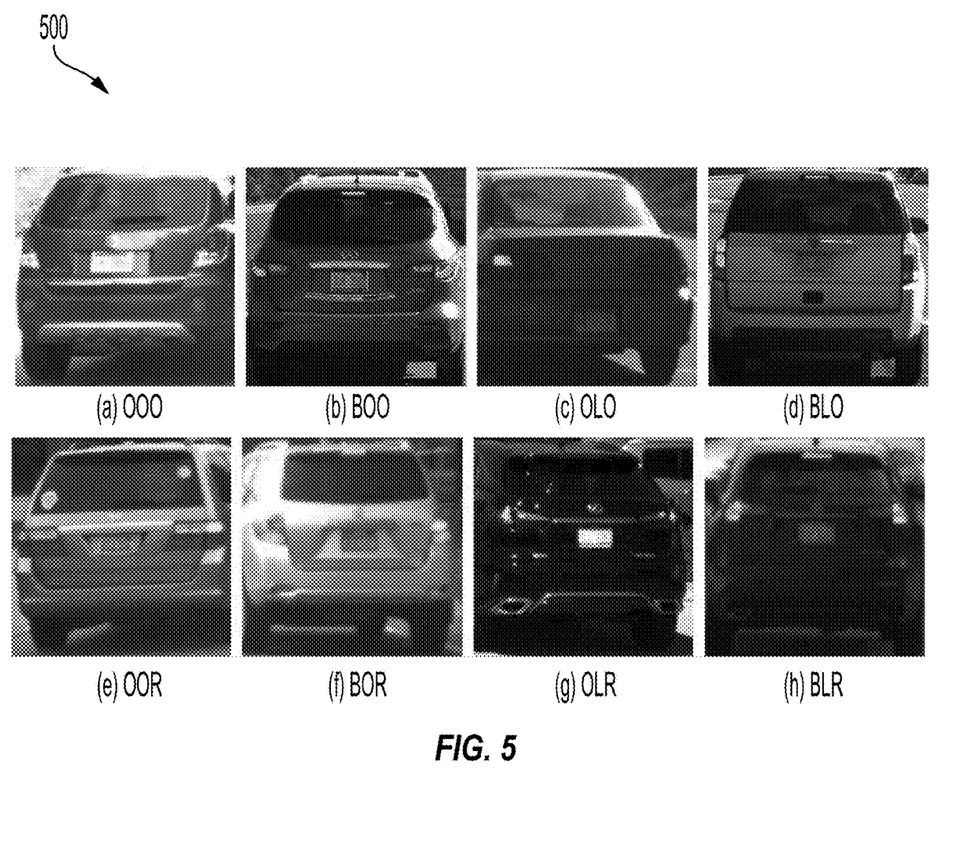
FIGS. 5A to 5H are images illustrating vehicle taillight states, according to aspects of the present disclosure.

At block 706, an LSTM network of the CNN-LSTM framework selects frames within the selected region of the sequence of images according to a temporal attention model for vehicle taillight state recognition. For example, as shown in FIG. 4, the temporal attention model 440 is implemented based on an output (e.g., the set of hidden variables (H=$\{h_t\}_{i=1}^{T}$) and memory cells (C=$\{c_t\}_{i=1}^{T}$) provided by the LSTM network 430. At block 708, an intent of an ado vehicle is inferred according to a vehicle taillight state determined from the selected frames within the selected region of the sequence of images. For example, as shown in FIG. 5, a vehicle taillight state is determined from the selected frames within the selected region of the input image sequence 402 (FIG. 4), as shown in FIGS. 6A and 6B. At block 710, a trajectory of the ego vehicle is planned according to the inferred intent of an ado vehicle. For example, as shown in FIG. 3, the trajectory planner module 316 plans a trajectory of the car 350 (e.g., ego vehicle) according to the inferred intent of the ado vehicle determined by the intent inference module 314.

The taillight recognition described above includes a spatial attention model and a temporal model. Each model may supplement a convolutional neural network (CNN)-long short-term memory (CNN-LSTM) framework for vehicle taillight recognition. In this aspect of the present disclosure, the spatial attention model is integrated with a CNN of the CNN-LSTM framework. The spatial attention model may help to train the CNN-LSTM framework to selectively focus on certain images in a sequence of images for region selection. In addition, a temporal attention model is integrated with an LSTM network of the CNN-LSTM framework. The temporal attention model may help train the LSTM network to perform frame selection within the selected region of the sequence of images. For example, the spatial attention model may be configured along a temporal dimension (e.g., direction) to focus on portions of the sequence of images important to vehicle taillight recognition, for example, as described above.

In some aspects, the method 700 may be performed by the SOC 100 (FIG. 1) or the software architecture 200 (FIG. 2) of the autonomous vehicle 150. That is, each of the elements of method 700 may, for example, but without limitation, be performed by the SOC 100, the software architecture 200, or the processor (e.g., CPU 102) and/or other components included therein of the autonomous vehicle 150.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for performing vehicle taillight recognition, comprising:
    extracting spatial features from a sequence of images of a real-world traffic scene during operation of an ego vehicle;
    selectively focusing a convolutional neural network (CNN) of a CNN-long short-term memory (CNN-LSTM) framework on a selected region of the sequence of images according to attention weights assigned to each region of the sequence of images by a spatial attention model for a vehicle taillight recognition task;
    selecting, by an LSTM network of the CNN-LSTM framework, frames within the selected region of the sequence of images according to a temporal attention model for the vehicle taillight recognition task and attention weights for each time step of the sequence of images received from the CNN;
    inferring, according to the selected frames within the selected region of the sequence of images, an intent of an ado vehicle according to a taillight state of the ado vehicle, as determined from the selected frames within the selected region; and
    planning a trajectory of the ego vehicle according to the intent inferred from the ado vehicle.

2. The method of claim 1, further comprising:
    selectively focusing on focal regions of the sequence of images; and
    identifying more critical time steps of the sequence of images.

3. The method of claim 2, further comprising:
    identifying regions of interest in the sequence of images; and
    selectively focusing on the identified regions of interest.

4. The method of claim 2, further comprising selectively focusing on time steps of the sequence of images identified as having greater importance to the vehicle taillight recognition task.

5. The method of claim 1, further comprising recognizing the taillight state of the ado vehicle during autonomous operation of the ego vehicle.

6. The method of claim 5, further comprising adjusting the trajectory of the ego vehicle to avoid a collision based on the intent inferred from the ado vehicle according to the taillight state.

7. The method of claim 6, further comprising stopping the ego vehicle based on the intent inferred from the ado vehicle according to the taillight state.

8. A non-transitory computer-readable medium having program code recorded thereon for performing vehicle taillight recognition, the program code being executed by a processor and comprising:
 program code to extract spatial features from a sequence of images of a real-world traffic scene during operation of an ego vehicle;
 program code to selectively focus a convolutional neural network (CNN) of a CNN-long short-term memory (CNN-LSTM) framework on a selected region of the sequence of images according to attention weights assigned to each region of the sequence of images by a spatial attention model for a vehicle taillight recognition task;
 program code to select, by an LSTM network of the CNN-LSTM framework, frames within the selected region of the sequence of images according to a temporal attention model for the vehicle taillight recognition task and attention weights for each time step of the sequence of images received from the CNN;
 program code to infer, according to the selected frames within the selected region of the sequence of images, an intent of an ado vehicle according to a taillight state of the ado vehicle determined from the selected frames within the selected region; and
 program code to plan a trajectory of the ego vehicle according to the intent inferred from the ado vehicle.

9. The non-transitory computer-readable medium of claim 8, further comprising:
 program code to selectively focus on focal regions of the sequence of images; and
 program code to identify critical time steps of the sequence of images.

10. The non-transitory computer-readable medium of claim 9, further comprising program code to identify regions of interest in the sequence of images; and
 program code to selectively focus on the identified regions of interest.

11. The non-transitory computer-readable medium of claim 9, further comprising:
 program code to selectively focus on time steps of the sequence of images identified as having greater importance to the vehicle taillight recognition task.

12. The non-transitory computer-readable medium of claim 11, further comprising:
 program code to recognize the taillight state of the ado vehicle during autonomous operation of the ego vehicle.

13. The non-transitory computer-readable medium of claim 12, further comprising:
 program code to adjust the trajectory of the ego vehicle to avoid a collision based on the intent inferred from the ado vehicle according to the taillight state.

14. The non-transitory computer-readable medium of claim 13, further comprising:
 program code to stop the ego vehicle based on the intent inferred from the ado vehicle according to the taillight state.

15. A vehicle taillight recognition system, comprising:
 a taillight recognition module configured to extract spatial features from a sequence of images of a real-world traffic scene during operation of an ego vehicle, the taillight recognition module comprising:
  a convolutional neural network (CNN) of a CNN-long short-term memory (CNN-LSTM) framework configured to selectively focus on a selected region of the sequence of images according to attention weights assigned to each region of the sequence of images by a spatial attention model for a vehicle taillight recognition task; and
  an LSTM network of the CNN-LSTM framework configured to select frames within the selected region of the sequence of images according to a temporal attention model for the vehicle taillight recognition task and attention weights for each time step of the sequence of images received from the CNN;
 an intent inference module configured to infer, according to the selected frames within the selected region of the sequence of images, an intent of an ado vehicle according to a taillight state of the ado vehicle determined from the selected frames within the selected region; and
 a trajectory planner module configured to plan a trajectory of the ego vehicle according to the intent inferred from the ado vehicle.

16. The vehicle taillight recognition system of claim 15, further comprising a controller configured to control operation of the ego vehicle according to the trajectory selected by the trajectory planner module.

17. The vehicle taillight recognition system of claim 16, in which the controller is configured to stop the ego vehicle according to the trajectory selected by the trajectory planner module.

18. The vehicle taillight recognition system of claim 16, in which the controller is further configured to direct the ego vehicle to avoid a collision based on the intent inferred from the ado vehicle according to the taillight state of the ado vehicle.

19. The vehicle taillight recognition system of claim 15, in which the LSTM network of the of the CNN-LSTM framework is further configured to identify regions of interest in the sequence of images, and to selectively focus on the identified regions of interest.

20. The vehicle taillight recognition system of claim 15, in which the CNN of the CNN-LSTM framework is further configured to selectively focus on focal regions of the sequence of images, and to identify critical time steps of the sequence of images.

* * * * *